United States Patent [19]

Geffner

[11] 4,303,280

[45] Dec. 1, 1981

[54] OPEN ANTIFRICTION BEARINGS AND METHOD OF OPERATING THE SAME

[76] Inventor: Ted Geffner, 310 Acre La., Hicksville, N.Y. 11801

[21] Appl. No.: 147,759

[22] Filed: May 8, 1980

[51] Int. Cl.³ .............................................. F16C 29/06
[52] U.S. Cl. ..................................... 308/6 C; 308/6 R
[58] Field of Search .............. 308/6 C, 4 R, 6 R, 6 A, 308/6 B, 201

[56] References Cited

U.S. PATENT DOCUMENTS 4,025,128  5/1977  Geffner .............................. 308/6 C
4,128,278  12/1978  Headen et al. ..................... 308/6 C
4,206,951  6/1980  Ernst et al. ......................... 308/6 C Primary Examiner—Lenard A. Footland
Attorney, Agent, or Firm—Bauer & Amer

[57] ABSTRACT

An open bearing having one bearing race slotted to accommodate a support for the other race and in which the bearing elements supporting the load between the bearing surfaces of the races are able to more arcuately as well as linearly relative to and between the races to change their surfaces that engage with the races and to change their engagement with different portions of the race bearing surfaces to produce a more efficient bearing of longer life, and a method of operating such bearing.

15 Claims, 3 Drawing Figures

OPEN ANTIFRICTION BEARINGS AND METHOD OF OPERATING THE SAME

This invention relates to improvements in antifriction bearings and more particularly in open type bearings in which at least one of the races is provided with a slot such that it may move longitudinally relative to another race and to accommodate in the defines of the slot a support that supports the other race. In such arrangement the slotted race may be a bearing sleeve while the other supported race may be a bearing shaft.

Oftentimes a shaft forming a bearing race may be of such great extent or length that it must be supported between its ends to prevent or inhibit its deflection. In such instances the support of the race normally would interfere with the longitudinal operation of the unsupported shaft or race. If a shaft that forms the inner race of a bearing is supported intermediate its ends, the outer race that may be in the form of a bearing sleeve that is circumferentially encompassing the shaft, also must be provided with a longitudinal opening or slot to enable it to move linearly relative to the inner race. Bearings of this type are well known in the art. They are sometimes referred to as "open" type or slotted bearings.

Open type bearings are manufactured with the same structural details as those of other non-slotted bearings except that the unsupported race or sleeve is provided with the longitudinal opening or slot. Exemplary of such bearings are the open type bearings of Thompson Industries, Manhasset, N.Y., and The Barden Corporation, Danbury, Conn.

In the construction of the bearings of the prior art, the ball bearing elements that are in engagement between the races circulate between the races in an attempt to effect a change in their engaging surfaces. By changing the engaging surfaces of the ball bearing elements, there is effected a more even distribution of the bearing loads or forces over a larger number of the circulating bearing elements as well as over their engaging surfaces which change in their bearing engagement with the bearing surfaces of the inner and outer races. In practice, this has been found to increase the useful life of the bearing. Although these attempts at the circulation of the bearing elements and the changing of their surfaces are laudible, they do not fully treat the problem of surface wear and longevity of the bearing surfaces of the races.

In the prior art relating to open type or slotted bearings, the circulating ball bearing elements are guided in their movements between their bearing and non-bearing engagements with the races by a retainer or cage structure. The retainer is fixed in its position with respect to the moving race thereby to assure that the bearing elements will be properly guided in a desired restricted limited linear path of engagement with and between the races. Because of this, the linear path of engagement between the ball bearing elements and the surfaces of the races also is fixed. As a consequence, the engaged path on the races becomes worn and deteriorates resulting in damage to the races and also in damage to the ball bearing elements engaging the same. This reduces the effectiveness and life of the bearing itself.

Recognizing the problem of the prior art, the present invention teaches a method of operating an open type bearing to cause the ball bearings, as well as the race surfaces, to change during the period of operation of the bearing. As a result, the increased life of the bearing elements is enhanced, as is the increased life of the race surfaces to thereby produce an open bearing of greater effectiveness and longevity and of lesser expense.

The method teaching of the present invention is capable of being utilized with any conventional open type or slotted bearing of the type discussed above. It is also usable with bearings exemplified by the German Pat. to Schutz No. 1,930,067. In practice it has been found that antifriction bearings exemplified by my U.S. Pat. No. 4,025,128, that is uniquely able to function as a linear and a rotary bearing, may be made to have a longitudinal opening or slot to enable it to operate in accordance with the present invention.

In light of the above, the desideratum of the present invention is to provide an open type or slotted bearing of longer effective life than that of the prior art. In furthering the objects of the invention, it is desired to provide a method by which the surfaces of the bearing elements and the races are caused to change to effect greater longevity and usefulness. It is also an object of the invention to provide a bearing in which the bearing elements are permitted to change their surfaces and the race surfaces with which they engage.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings wherein.

Figure 1:
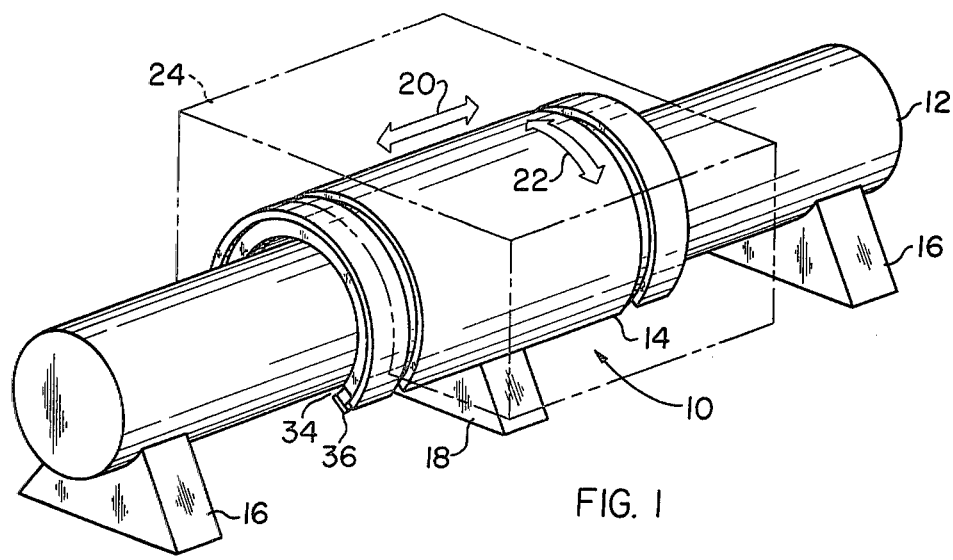
FIG. 1 is a perspective view of a bearing constructed according to the teaching of the invention.

Referring to FIG. 1 of the drawing, the antifriction open or slotted type bearing is generally identified by the numeral 10. The bearing 10 simulates FIG. 1 of my U.S. Pat. No. 4,025,128 and has been selected for illustration to enable the reader to recognize the universal application of the teaching of the present invention. Those who are skilled in the art will recognize that it is not material as to the particular bearing that is here illustrated. Rather, it will suffice to recognize that the invention can be utilized with any conventional bearing.

The bearing 10 has an inner race member 12 and an outer race member 14. To enable a clear and simple explanation, the race member 12 is in the form of an elongated shaft of substantial length that might normally tend to bow or deflect downward between its end supports 16. When such deflection is undesired, it is a common practice to support the same between the ends by one or more intermediate supports 18. Although the shaft race member 12 may simply rest on the support 18, it is common practice to secure the two together by any convenient means (not shown).

Figure 2:
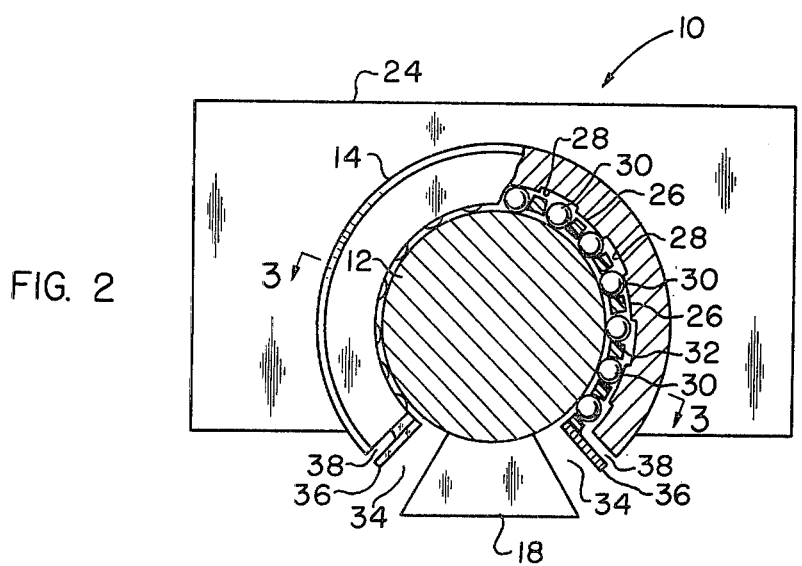
FIG. 2 is an end view of a bearing shown in FIG. 1 utilizing the teaching of the invention with a section thereof removed.

Because the bearing 10 selected for illustration is a linear rotary bearing as disclosed in my aforementioned patent, arrow 20 is used to depict the relative linear or reciprocating motion between the bearing members. In like manner, the numeral 22 identifies the direction of relative rotary movement of the two race members. No attempt will be made in this disclosure to discuss the specific details of structure of the linear-rotary bearing of my aforementioned patent that do not relate to the present invention. However, reference may be had to the aforementioned patent for a clearer understanding of the subject matter of the present invention. In referring to FIG. 2, it is noted that a carrier or load member 24 may be mounted on the outer bearing 14 for smooth, substantially frictionless movement with it relative to the shaft or inner race 12.

As in my aforementioned patent, the outer race 14 is provided alternately with circumferentially spaced lands 26 and recesses 28. The arcuately disposed lands 26 are of lesser extent than that of the adjacent recesses 28. The surfaces of the lands 26 are adapted to be engaged by sets of ball bearing elements 30 that circulate in paths defined in a cage or retainer 32. As is more fully explained and illustrated in my aforenoted patent, the ball elements 30 circulate between their respective load bearing and non-load bearing positions wherein they are in bearing engagement between the surfaces 26 of the outer race 14 and the outer surfaces of the inner race 12.

In the drawing the outer race 14 is formed with a longitudinally directed opening or slot 34 that extends for the full length thereof. The arcuate extent of the slot 34 is such as to permit the outer race 14 to move freely in a longitudinal direction relative to the support 18 without interference therewith and also to allow for whatever relative rotary movement the load 24 must describe about the inner race shaft 12 in the event the bearing 10 is used both as a linear and rotary bearing structure. Obviously, the slot 34 may be of a lesser arcuate extent for a linear reciprocating bearing than is required for a linear-rotary bearing of the type illustrated.

A similar longitudinally extending opening or slot is defined or provided on the retainer 32, except that the arcuate extent thereof is less than that of the opening 34. This can be seen more clearly in FIG. 2 in which the end defines of the opening of the retainer 32 are provided with limiting means in the form of radially directed stops 36. The stops 36 are positioned within the opening 34 to allow for limited arcuate movement of the retainer 32 relative to and between the bearing surfaces of the inner and outer races 12 and 14. Therefore, unlike the known prior art open type or slotted bearings in which the rolling bearing elements were fixed in position with respect to one or both races, the present invention now deliberately provides for relative rotation of the retainer 32 with respect to the bearing surfaces of the races.

In the operation of the linear-rotary bearing of my aforenoted patent, which has here been used as an example of how the present invention may be utilized, it is important to limit the arcuate extent of relative movement between the bearing elements 30 and the lands 26. Accordingly, the permissible arcuate movement will be dictated by the engagement of the limit means or stops 36 with the adjacent walls 38 of the defining ends of the outer race 14. In practice, the stops 36 will be spaced from the walls 38 by an amount equal to one-half the arcuate extent of the space between the bearing elements in the retainer 32 to assure proper and continuous bearing engagement between the bearing elements 30 and the races 12 and 14 of the lands 26. Therefore, when retainer 32 rotates relative to the walls 38 of the slot 34, the elements 30 will remain captured in the retainer by the race 14. This means that within the limits of the arcuate movement of the retainer 32, the bearing elements 30 never will be exposed or positioned within the defines of the slot or open 34 or be located so far beyond the walls 38 as to be able to fall out of the retainer or to be displaced from between the races 12 and 14. Although the stops 36 are shown on the retainer 32 for engagement with the walls 38, it should be apparent to those skilled in the art that a reversal of the same is within the teaching of the invention.

When the bearing 10 is used as the linear bearing, that is to say, in a purely reciprocating direction, the bearing elements 30 will circulate in the retainer 32 between their non-load bearing positions in which they are within the defines of the recesses 28, and their load bearing positions in which they are engaged with the lands 26 of the race 14 and the race 12. Because the operation of the bearing 10 is fully described in my aforenoted patent, reference may be had thereto and a repetition of such discussion herein would be superfluous. During such pure reciprocating operation of the bearing 10, the bearing elements 30 rotate and change their surfaces for engagement with the surface of the race 12 and the surfaces of the lands 26.

However, it has been discovered that when the elements 30 are also permitted freer arcuate movement during their engagement between and relative to the same surfaces, they will be affected by the grain of such surfaces, by dust or dirt on the surfaces or on the retainer and also by their rubbing engagement with the guiding walls of the retainer 32. As a consequence, they are caused to rotate in a skewed manner or in a direction that is angled relative to the longitudinal axis or direction of movement of the bearing 10. This causes the elements 30 to creep in a direction that is skewed to the direction of reciprocation of the bearing. When the bearing elements 30 are caged or retained in their fixed paths by a retainer means that is also fixed with respect to one of the bearing races such as is the practice of the prior art of open type bearings, they are forced to move and rotate in a constant fixed and unchanging line of engagement with the surfaces of the races 12 and 14.

This error in the prior art is now obviated. By recognizing the desire of the bearing elements to skew or creep in accordance with the forces applied to them by the race surfaces and surrounding structures with which they engage, it is now possible to operate an open bearing and to provide an open bearing of longer life than those heretofore known and with greater efficiency. This is done by permitting the retainer 32 to move within the bearing and relative to the races and their surfaces in response to the movements of the bearing elements 30 they retain. For this reason, the retainer 32 is permitted to move freely within the bearing under the influence of the bearing elements 30. The movement of the retainer is limited by the limiting stop means 36 engaging with the defining walls 38 of the slot 34. In a linear-rotary bearing in which the linear or rotary motions or a combination of such motions are required to be performed by the bearing elements 30, the same will be permitted to so move and enhanced in their movements by the retainer 32 that is also movable between the race surfaces and members.

Such motions of the bearing elements 30 relative to the race surfaces between which they engage enable the bearings to distribute the loads they support over their ever-changing surfaces. Obviously, the ever-changing surfaces result in bearing elements having longer effective bearing lives. Further enhancement of ball bearing life and longevity of the bearing as a whole results from the fact that the elements 30 no longer are retained and restricted to a specific and constant point or line of engagement with the race surfaces. Once again, by permitting the bearing elements 30 to change and vary the surfaces of the races with which they engage during their creeping movements, such race surfaces also experience greater life because they are able to distribute and support the loads over greater surface areas.

Figure 3:
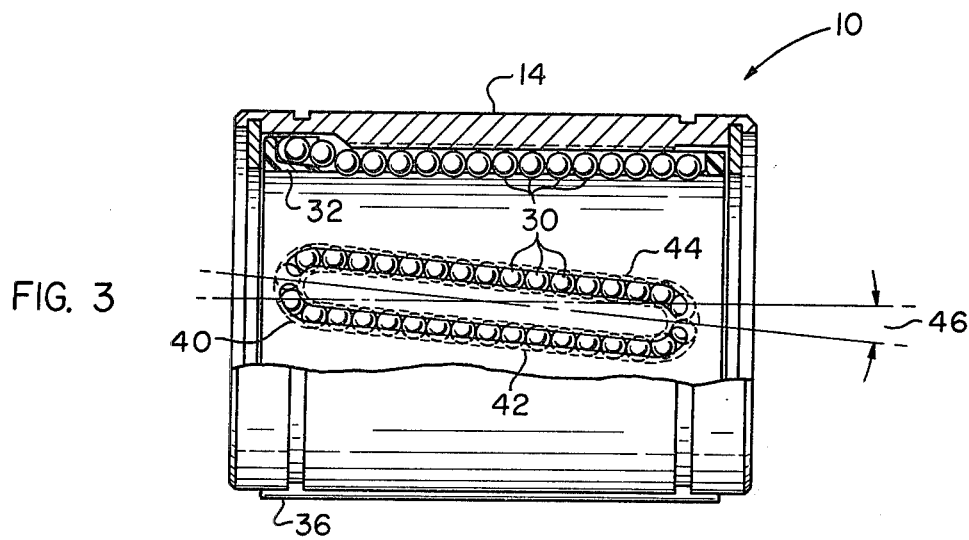
FIG. 3 is a plan view of FIG. 2 taken substantially along lines 2—2 with the inner race or shaft omitted.

FIG. 3 is intended to illustrate a deliberate attempt to induce bearing creep and skewing motion as well as changing and varying surface area engagement by the bearings with the surfaces of the races. The illustration of FIG. 3 depicts a bearing like that of my aforenoted patent. The bearing elements 30 circulate in closed loop paths 40 (only one of which is fully illustrated) between a load bearing leg 42 and a non-load bearing leg 44. The bearing elements 30 are induced and actually caused to creep in a direction that is skewed to the direction of relative movement of the inner and outer races by positioning the legs 42 and 44 of the path 40 at an angle 46 to the longitudinal axis of the bearing. In FIG. 3 the inner shaft race 12 has been omitted while the details of the remaining structural elements have not been discussed nor are they illustrated inasmuch as they form no part of this invention and may be readily understood from a reading of my aforenoted patent.

The operation of the structure of FIG. 3 is the same as that previously described. During the reciprocating or linear operation of the bearing of FIG. 3, the elements 30 will be caused to move in a skewed direction as dictated by the effects of forming the closed loop path 40 at the angle 46 to the longitudinal axis of the bearing. The changing directions of movement of the bearing elements 30 enable them to more evenly distribute the forces applied to them and to sustain the same such that they experience increased bearing life. Such induced movements also cause the bearing elements 30 to move the retainer 32 arcuately relative to the engaged race surfaces so as to change the surfaces with which the bearing elements engage to thereby result in increased surface bearing life of the races and their usefulness.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In an open bearing having inner and outer relatively movable load applying members in which at least one of the load applying members is supported intermediate its ends and the other of the load applying members has an arcuate slot defined therein to enable its movement relative to the supported load applying member and to its support, said bearing comprising
   retainer means movable between and arcuately relatively to the load applying members,
   said retainer having an arcuate slot defined therein and aligned with the slot of the load applying member,
   bearing elements between the load applying members and in rolling engagement therewith to support the load between and applied by the load applying members,
   said bearing elements being retained by said retainer means between said load applying members for engagement therewith and for said arcuate movement relative to the load applying members to enable said bearing elements to move in said retainer means and to change their arcuate positions of engagement with the load applying members,
   and means to limit the arcuate movement of said retainer means relative to the load applying members.

2. In an open bearing as in claim 1,
   said movement limit means cooperating between said retainer means and one of said load applying members to limit the arcuate movement said bearing elements have relative to the load applying members.

3. In an open bearing as in claim 2,
   said bearing elements being ball bearings moving into and out of engagement with the load applying members.

4. In an open bearing as in claim 3,
   at least one of the load applying members having relatively arcuately spaced and arcuately extending bearing lands,
   and said retainer means and ball bearings retained thereby being limited in their arcuate movement relative to the relatively movable load applying members by said movement limit means to an extent to prevent the disengagement of said ball bearings with the arcuate bearing lands.

5. In an open bearing as in claims 1 or 3,
   said movement limit means including stops on said retainer means cooperating with the opposite ends of the slot defined on the load applying member to limit the arcuate movement of said bearing elements relative to said load applying members.

6. In an open bearing in which one of the race members is slotted to accommodate a support of another of the race members so as to afford movement of the one race member relative to the other and in which each of said members have bearing lands, the invention comprising
   a plurality of bearing elements each having their surfaces engageable between the bearing lands defined on the race members to support loads applied to the race members,
   means retaining said plurality of bearing elements between the race members for their engagement therebetween,
   said retainer means having a slot to accommodate the support of the other race member and movable at least arcuately with said one race member relative to the other race member while said retainer and one race member are movable at least arcuate relative to each other to cause said plurality of load bearing elements to change their surfaces of engagement with the load bearing lands on said race members,
   and means to limit the extent to which said retainer and one race member move relative to each other.

7. In an open bearing as in claim 6,
   stop means on and cooperating between said retainer and said one race member to limit the relative movement therebetween.

8. An open bearing comprising
   a circular inner race,
   means supporting the inner race intermediate its ends,
   a circular outer race movable reciprocably relative to said inner race and circumferentially disposed about a portion of said inner race and having a slot defined therein accommodating said supporting means to enable said relative movement, bearing lands on said races for engagement with bearing elements therebetween, the bearing lands on one of said races being a plurality of relatively arcuately spaced arcuately extending surfaces, a plurality of bearing elements between said races and their respective bearing lands with certain of said bearing elements moving into and out of bearing engagement between said bearing lands so as to bearingly support the load between the bearing elements and said bearing lands, and slotted retainer means between said races with the slot thereof being of smaller arcuate extent than the arcuate slot of said outer race and retaining said plurality of bearing elements between said bearing lands for reciprocating movement with said outer race relative to said inner race and for rotative movement relative to said races such that said bearing elements move into and out of bearing engagement with said bearing lands and they rotate to present changing portions of their surfaces for said bearing engagement and move arcuately relative to said arcuately spaced bearing lands to vary the surfaces of said bearing lands engaged by said bearing elements.

9. An open bearing as in claim 8, means on said retainer means cooperating with said outer race to limit the rotative movement of said retainer means relative to said outer race and to limit the arcuate movement of said bearing elements relative to said arcuate bearing lands.

10. An open bearing having inner and outer race members in which the outer race member is defined with a slot to accommodate a support for the inner race member, said bearing comprising a plurality of ball bearings engaged between said inner and outer races and moving between said races to present different portions of their bearing surfaces for engagement with said races thereby to more evenly distribute the forces applied to said race members such that the ball bearings experience increased bearing life, retainer means retaining said ball bearings between said races, said retainer means having a slot defined therein to accommodate the support for said inner race, and said retainer means being movable rotatively relatively to said race members to enable the ball bearings to rotate relatively to said race members in the direction of rotation of said retainer.

11. An open bearing as in claim 10, said slot defined in said retainer being of less arcuate extent than the slot of said outer race, and means cooperating with said retainer to limit the relative rotation of said retainer.

12. The method of operating an open circular bearing in which one of the inner and outer races is slotted to move relative to a support for the other race comprising retaining a plurality of ball bearings for bearing engagement with and between relatively reciprocating inner and outer races, and permitting the ball bearings to move arcuately relative to the inner and outer races while in bearing engagement with and between the races, and limiting the arcuate movement of the ball bearings relative to the races with which the same are in bearing engagement to cause the ball bearings to change their surfaces of engagement with the races and with the surfaces of the races which they engage.

13. The method as in claim 12, restricting the retainer for the ball bearings to arcuate movement that prevents the ball bearings from being displaced from between the inner and outer races.

14. The method as in claim 13, permitting the arcuate movement of the ball bearings by permitting the retainer to move arcuately between and relative to the races.

15. The method as in claim 14, slotting the retainer to an arcuate extent less than that of the slotted race, and limiting the extent of arcuate movement of the ball bearings by limiting the extent of arcuate movement of the retainer slot relative to the slot of the slotted race.

* * * * *